Fig. 3.

April 1, 1958 W. WEBB ET AL 2,828,594
APPARATUS FOR STACKING ARTICLES
Filed Feb. 1, 1954 11 Sheets-Sheet 5

Fig. 5.

Inventors
William Webb
Gunter Wittenberg
by Pierce, Scheffler + Parker
attys

United States Patent Office

2,828,594
Patented Apr. 1, 1958

2,828,594
APPARATUS FOR STACKING ARTICLES

William Webb and Gunter Wittenberg, Park Royal, London, England, assignors to Frederick C. Kane Limited, London, England, a British company Application February 1, 1954, Serial No. 407,454

4 Claims. (Cl. 53—162)

The present invention relates to a new or improved method of and apparatus for stacking articles, and is utilisable, for example, for packing articles into containers.

In the method according to the present invention the articles to be stacked are first formed into rows a number of rows then being positioned side by side to form a layer, upon which further rows of articles in layer formation are placed to produce a stack of articles.

According to the present invention a method of stacking articles in layers as set out above comprises the steps of positioning a row of articles adjacent pusher means having a platen extending along the length of a positioned row, operating the pusher means to cause the platen to move the row of articles onto a supporting platform disposed at one side of the row of articles and to return the platen in readiness for the delivery of a further row of articles and lowering the supporting platform as each layer is completed to permit the successive stacking of further layers.

In the present specification the term "row of articles" is to be understood to mean either a single article or a plurality of articles. Thus in the former case wherein each row consists of a single article a layer would consist of a number of such articles placed side by side. Further, where the articles are of sufficient size a "layer" may consist of a single row.

The invention also contemplates the provision of apparatus for carrying out the method of stacking articles as set out above such apparatus comprising means for supporting a positioned row of articles to be stacked, platform means for supporting the stacked articles, pusher means having a platen extending along the length of the assembled row, operable to effect movement of the platen in one direction to discharge an assembled row of articles from the supporting means to the platform means, and to return the platen in the opposite direction in readiness for the discharge of a further row of articles and means for effecting vertical movement of the supporting platform as each layer of articles is completed to permit the successive stacking of further layers.

If the articles to be stacked consist of small packages such, for example, as the conventional blocks of margarine, butter or the like, the upper surface of each layer may not be smooth enough to permit the free movement across the same of the rows of articles forming the next succeeding layer with the result that the articles may be displaced, such displacement causing damage to the articles and stoppage of the machine.

To avoid this the apparatus is provided with a supporting plate which is mounted so as to be movable into position to cover the upper surface of a completed layer, the rows of articles forming the next succeeding layer being delivered onto the supporting plate, the supporting plate being then withdrawn from between the two adjacent layers and repositioned in readiness for a further layer.

The provision of the supporting plate has a particular advantage when stacking and packing plastic substances such as butter, margarine or other fats as such substances very often are in a softened condition which renders handling of the same by automatic machinery extremely difficult, as when in this condition the blocks are very easily deformed or otherwise damaged with the result that stacking and packing cannot be carried out efficiently. Previously it was usual when necessary to harden such substances before packing but under present day methods of manufacture it is proposed to reduce if not to eliminate entirely the hardening of the substance so that the packing of substances of a plastic nature can be effected with as little delay as possible.

The apparatus of the present invention is particularly suitable for packing articles in layers into cartons or containers, and avoids the wasteful use of manpower at present used for this purpose.

Therefore according to a further aspect, the present invention provides apparatus for packing articles in layers into a carton or container, said apparatus comprising means for supporting a positioned row of articles forming part of a layer of articles, a magazine for supporting a carton or container with an open side opposing the positioned row of articles, pusher means having a platen extending along the length of the assembled row, operable to effect movement of the platen in one direction to discharge an assembled row of articles into the container, and to return the platen in the opposite direction in readiness for the discharge of a further row of articles and means for effecting vertical movement of the magazine as each layer of articles is completed to permit the successive stacking of further layers and means operable automatically to effect in the desired sequence the movements of the pusher means and magazine.

Preferably also according to this further aspect of the invention the apparatus is provided with means for effecting automatically the discharge of a filled carton or container.

A machine for packing into a carton small packages, such as wrapped blocks of margarine or butter, will now be described by aid of the accompanying drawings in which:

Fig. 4 is a fragmentary side view showing stop means for holding the carriage in each layer assembly and loading position.

Figure 1:
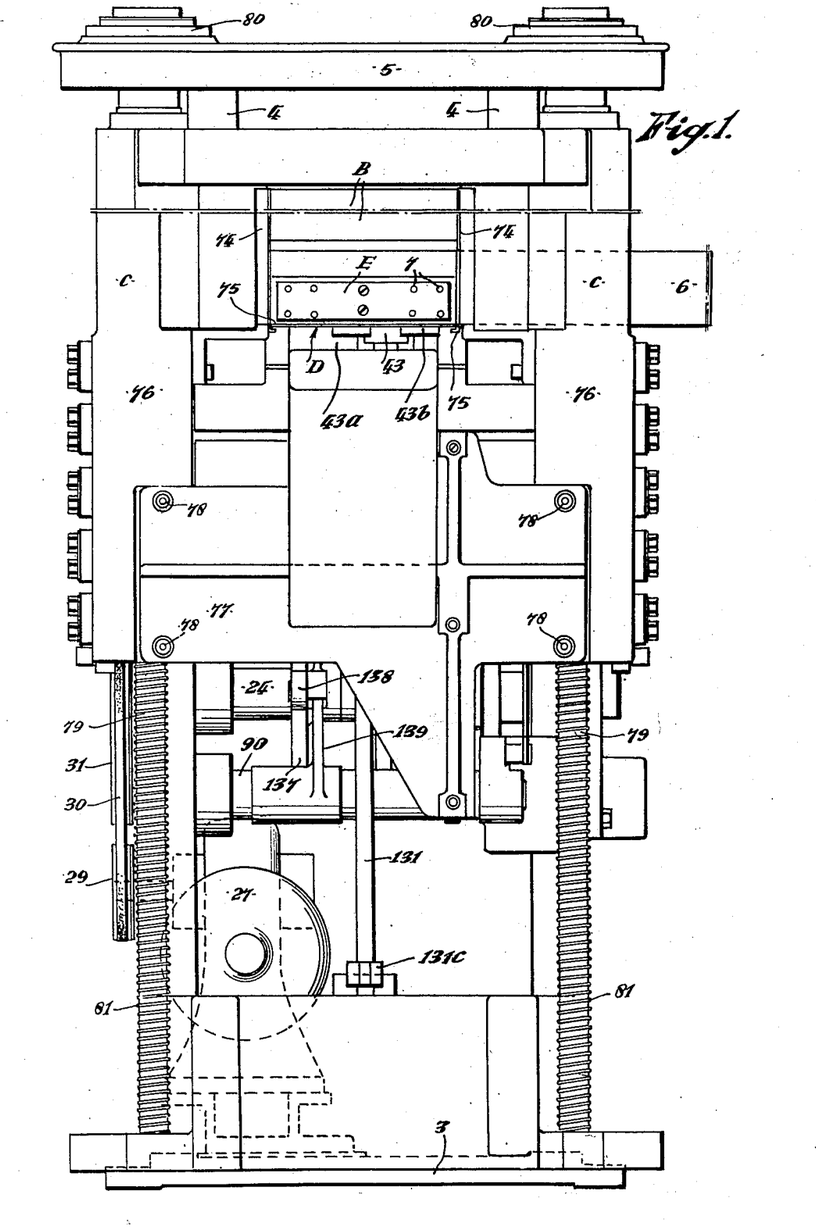
Fig. 1 is a view of the machine as seen from one end, and hereinafter referred to as the "front end.
Figure 2:
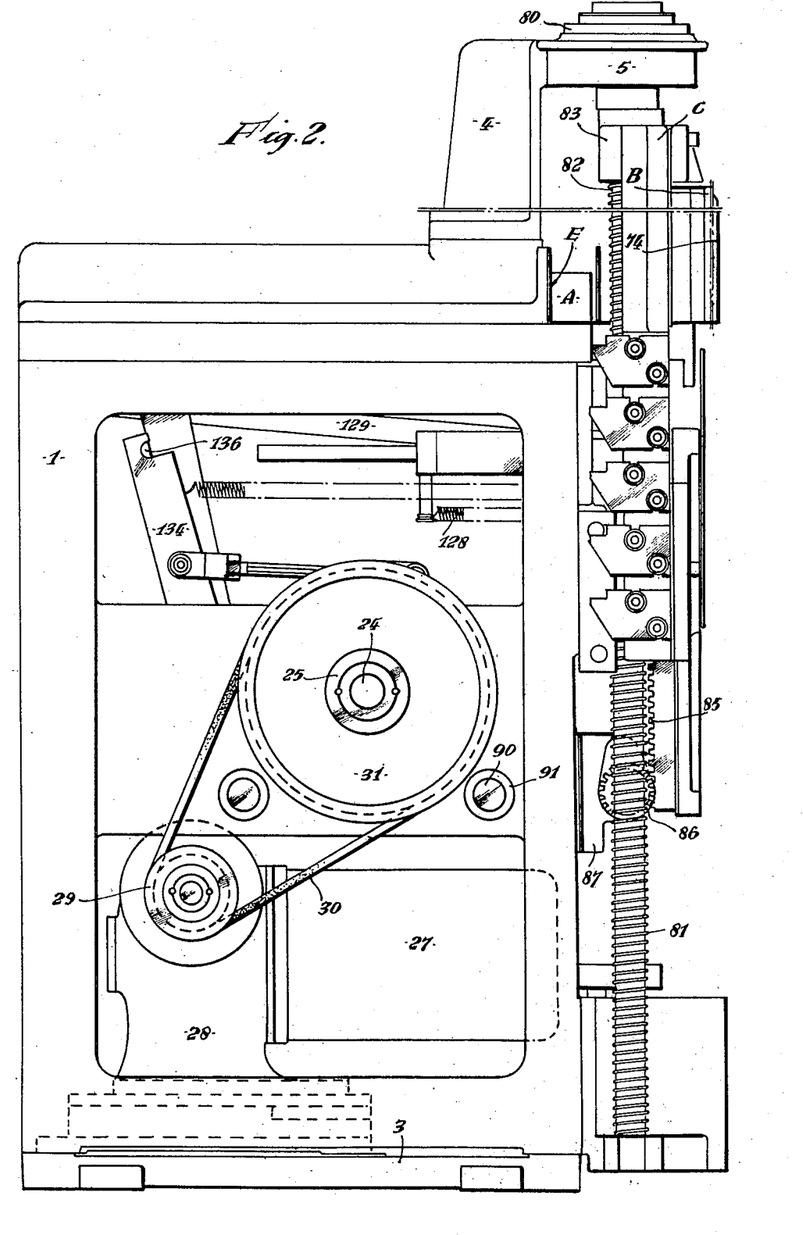
" and Figs. 2 and 3 are views of the machine as seen from opposite sides hereinafter referred to respectively as the "left and right hand sides."
Figure 3:
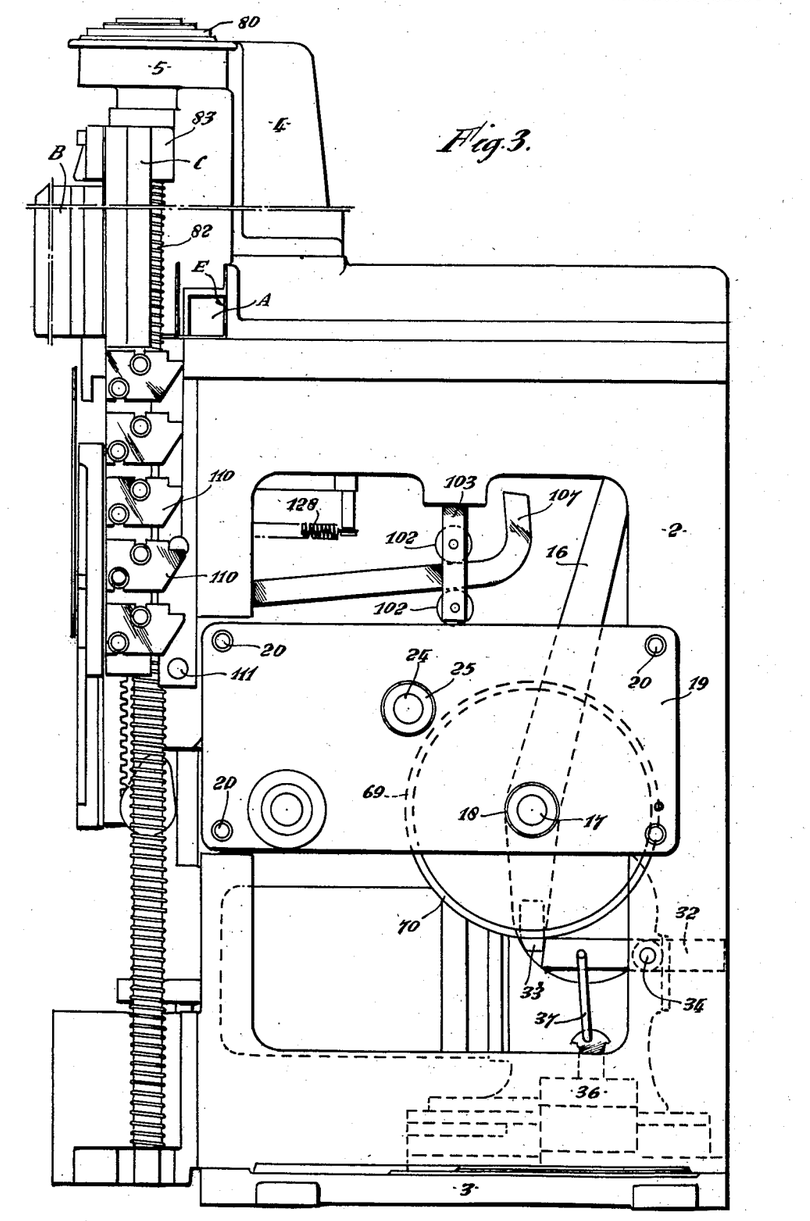
Figure 5:
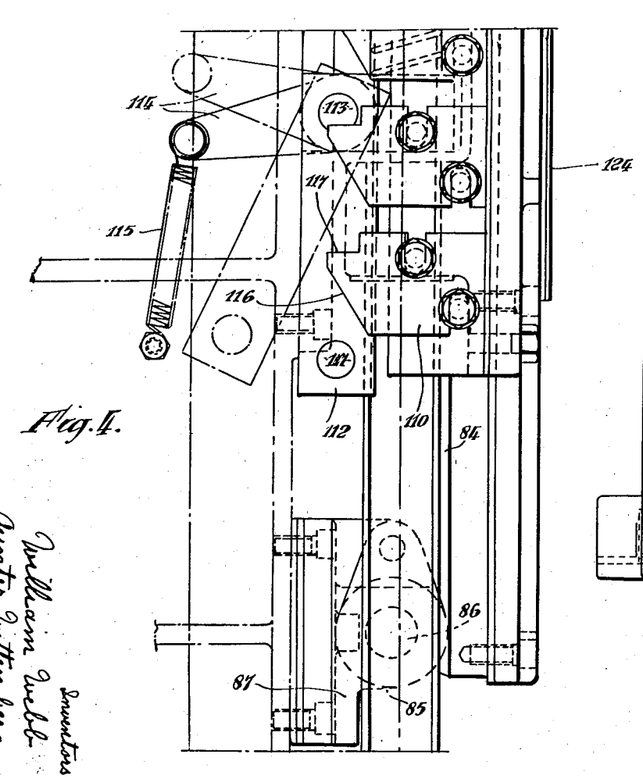
Fig. 5 is a view to an enlarged scale of the operating mechanism as seen from the left hand side of the machine, some of the components being removed for the sake of clarity.
Figure 6:
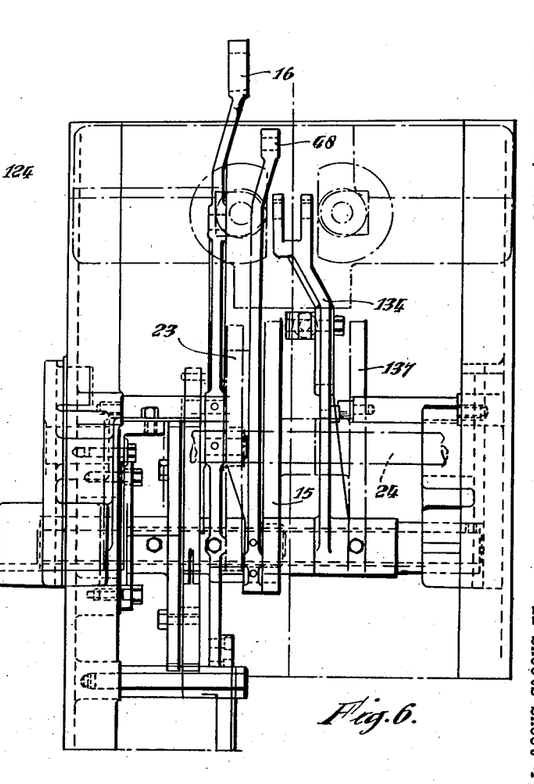
Fig. 6 is a view of the operating mechanism shown in Fig. 5 as seen from the rear end of the machine, several components having been removed for the sake of clarity.

In the machine shown in the drawings a first row of packages A is formed opposite the open end of a carton (not shown) which is positioned on a magazine B supported by a carriage C which is movable step by step from the upper position shown in Figs. 1, 2 and 3 to a lowered position for discharge from the machine. Each row of packages is formed along one edge of a supporting plate D which extends into the carton to provide a false bottom for each layer of packages as it is formed.

The first row of packages A is then pushed by a pusher platen E into the carton, the pusher platen then being withdrawn to permit a second row of packages A to be formed on the supporting surface.

The pusher platen E is again operated to push this second row towards the carton, the packages in their travel engaging with the previously displaced row to push the same further into the carton a distance equal to the width of the packages. Succeeding rows are then pushed into the carton until a first horizontal layer is completed whereupon the supporting plate D is withdrawn from beneath the layer of packages the layer of packages being then supported by an inner wall of the carton. The carriage C is then lowered a distance approximately equal to the depth of the said first layer and the supporting plate is again moved into the supporting position so as to extend into the carton above the previously formed layer in readiness for the formation of the second layer of packages A.

The above sequence of operations is continued until the last layer of packages has been packed into the carton. The filled carton is then discharged automatically, or alternatively removed by an operator, from the magazine B which is then in its lowered position. Upon removal of the carton the carriage C is returned to the upper position in readiness for the filling of a further carton.

The operations are all effected automatically and in timed sequence with one another through mechanism which according to the present embodiment is cam operated.

The machine comprises a supporting stand having the left and right hand side frame members 1 and 2 respectively projecting upwardly from a base 3. The upper end of the supporting stand is provided at the front end of the machine with two upwardly projecting pillars 4 spaced one on either side of the machine the pillars being connected at their upper ends by a bracing beam 5. The pillars are provided for the support of guideways for the carriage C and will be described fully hereinafter.

The packages A are fed into the machine through a guide chute 6 of channel section which extends outwardly from the right hand side of the upper surface of the supporting stand. The guide chutes can however be arranged on the left hand side of the machine. The dimensions of the channel section of the guide chute are such that the packages are formed into a row as they are fed into the machine. The packages may be placed in the guide chute by an operator but preferably they are fed from a conveyer, the discharge end of the conveyer being placed adjacent to and in line with the outer end of the guide chute 6.

For the sake of clarity the sequence of operations and the mechanism for effecting such operations will be described separately and under their respective headings.

*Pusher platen E*

The pusher platen E consists of a vertically disposed plate which is secured by countersunk screws 7 to two brackets 8a carried on the forward end of two guide bars 9.

The guide bars 9 are spaced apart from one another on opposite sides of the longitudinal centre line of the machine, each guide bar being slidably mounted in a pair of spaced bearings 10, supported on the upper surface of the supporting stand. Grease nipples 11 are provided for lubricating the guide bars 9, the said grease nipples being carried by a removable cover 12 enclosing the upper end of the supporting stand.

A bracket 8 is coupled by a shackle pin 13 to one end of a connecting rod 14, the opposite end of which is connected by a further shackle pin 15 to the upper end of a swinging lever 16. The swinging lever 16 extends downwardly of the supporting stand and is pivotally mounted intermediate its length on a cross shaft 17 which extends transversely across the width of the machine adjacent the rear thereof, the cross shaft being supported at its opposite ends in bearings 18, the bearings 18 on one side of the machine being carried in a side plate 19 detachably secured by bolts 20 to the side frame members of the supporting stand, the bearings 18 on the opposite side of the machine being assembled in housings formed in the machine framework.

Figures 11, 13:
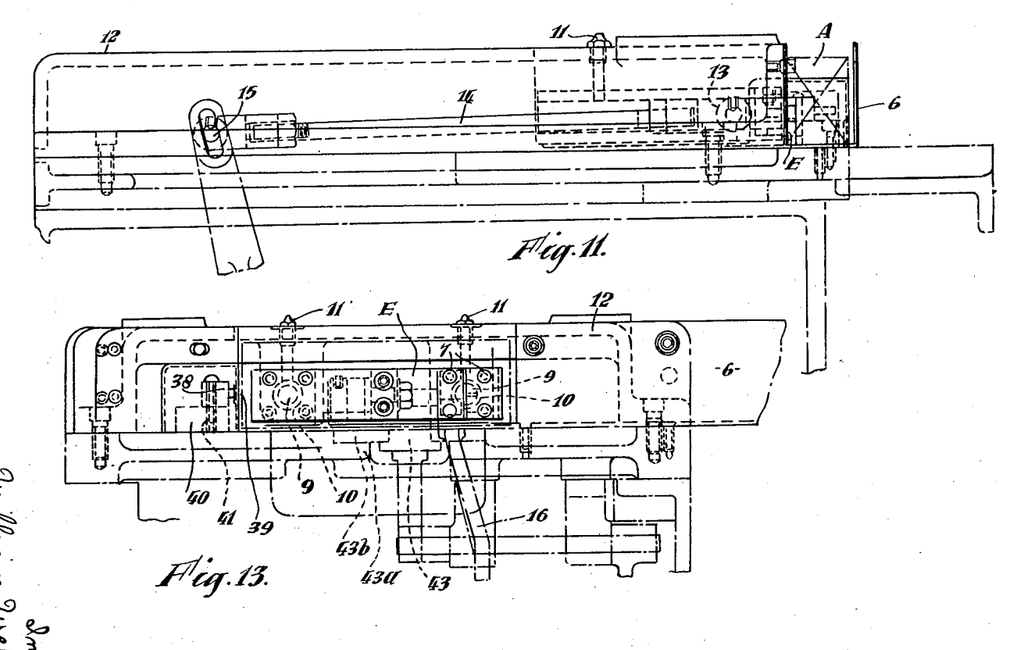
Fig. 11 is also a side view of a portion of the upper part of the machine as seen from the left hand side the figure showing particularly the package pusher means.
Figs. 12 and 13 are plan and end views respectively of the portions of the machine shown in Fig. 11.

The swinging lever 16 is turned in a clockwise direction to move the pusher platen E to the right, Fig. 11, to push a complete row of packages A into a carton positioned on the magazine, the pusher platen E being returned in the opposite direction to permit a further row of packages to be assembled in front thereof by effecting anti-clockwise movement of the swinging lever 16.

The clockwise movement of the swinging lever 16 is effected by a tension spring 21 one end of which is anchored to the swinging lever 16 whilst the other end is anchored to a fixed anchorage pin 22. The swinging lever 16 is urged against the pull of the spring 21 in an anti-clockwise direction by an edge cam 23 which is secured to so as to rotate with a cam shaft 24 which extends transversely across the width of the machine and is supported at its opposite ends in bearings 25. The periphery of the edge cam 23 is in contact with a cam follower 26 carried by the swinging lever 16.

The cam shaft 24 is driven by an electric motor 27, supported by the base of the supporting stand, through a reduction gearing 28, the output pulley 29 of which is connected by a belt drive 30 to pulley wheels 31 mounted on one end of the cam shaft.

Operation of the swinging lever 16 by the spring 21 is prevented until a complete row having the desired number of packages A is assembled in front of the pusher platen E. For this purpose the lever 16 is held in an extreme anti-clockwise position by a trip catch 32 the free end of which engages the lower end 33 of the swinging lever. The trip catch 32 is pivotally mounted intermediate its length on a horizontally disposed pivot pin 34 mounted adjacent the lower end of the supporting stand, the trip catch being urged by a spring 35 into engagement with the end 33 of the swinging lever.

The trip catch 32 is pulled out of engagement with the swinging lever upon energisation of a solenoid 36 the plunger of which is connected to one end of a connecting rod 37, which is anchored by its other end to the trip catch 32.

The circuit of the solenoid 36 is controlled by a microswitch 38 the operating button of which is disposed in opposition to a pressure plate 39 which is disposed at right angles to the pusher platen E. In the arrangement shown in Fig. 12 the pressure plate 39 is a flexible plate secured along one edge to the casing of the microswitch. The pressure plate 39 is positioned at the limit of the end of a row of packages and is adapted to be engaged by the end surface of the end package in the row, such engagement causing the pressure plate to be displaced into contact with the operating button of the microswitch to energise the solenoid 36.

Figure 12:
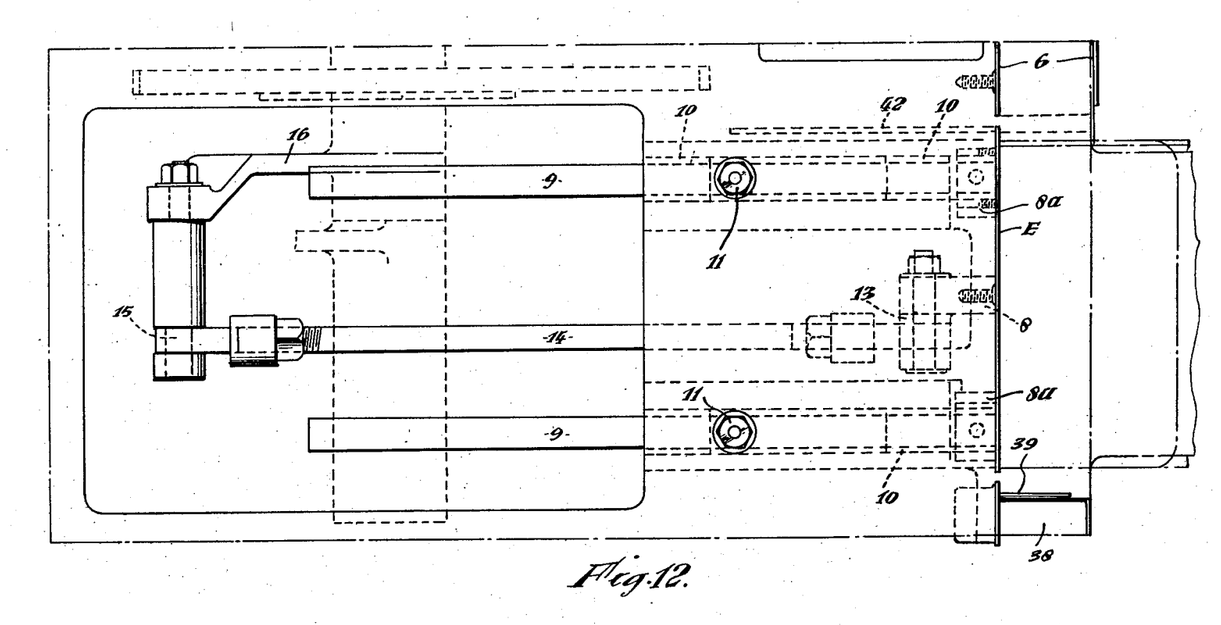

As the pusher platen E is operated to push a row of packages A into a positioned carton the assembly of further packages from the guide chute 6 is prevented by positioning a stop member in the path of movement of the packages. As shown in Fig. 12, the stop member consists of a plate 42 forming a right-angled extension of the pusher platen E, the plate 42 being thus moved across the inner end of the guide chute 6 upon forward movement of the pusher platen E.

The feeding of the packages to the machine is operated independently of the timed movements of the swinging lever 16, thus if the feeding of the packages is interrupted and then re-started it is possible that the pressure plate 39 will be operated to release the swinging lever at a time when the edge cam 23 is at an angular position wherein the same is out of contact with the swinging lever. In this position the swinging lever 16 would be pulled rapidly in a forward direction by the spring 21 such motion probably effecting either displacement of the packages in the row and/or damage to said packages.

Figures 14, 15:
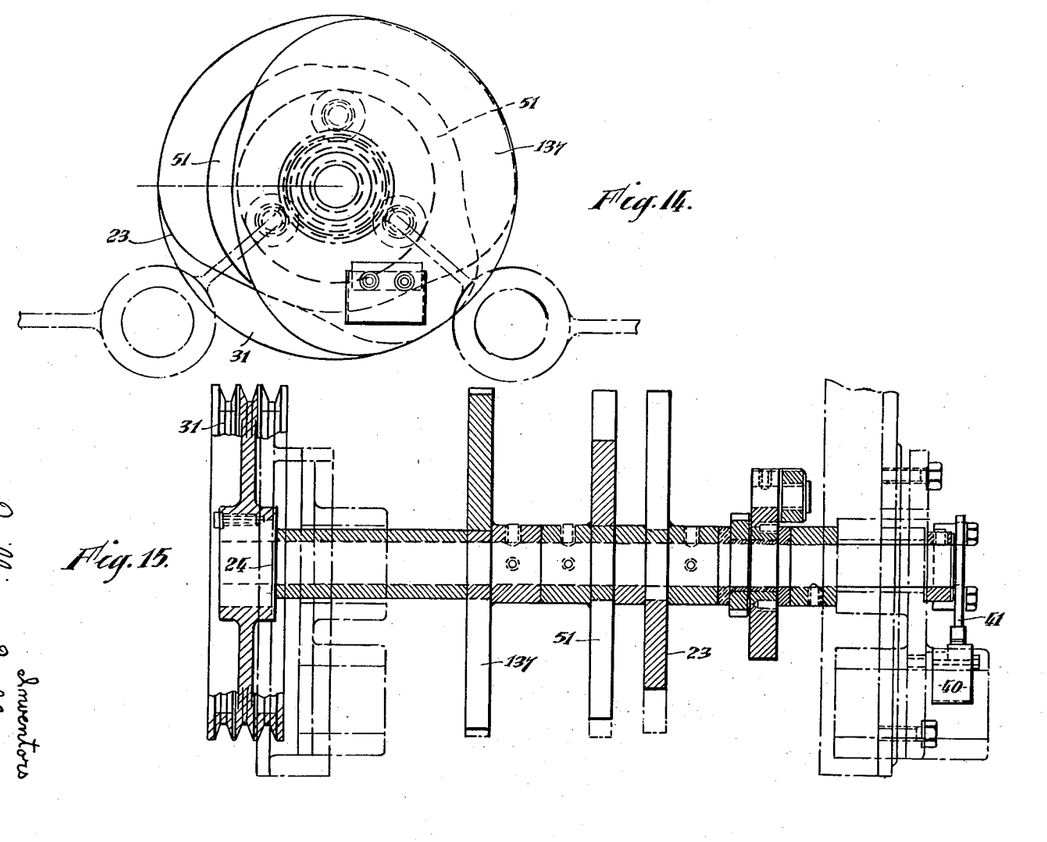
Figs. 14 and 15 are side and front views respectively of the cam assembly utilised for obtaining the synchronised operation of the operating mechanism of the machine.

To avoid the above a second micro-switch 40 (see Fig. 15) is provided, which is connected in series with the micro-switch 38 and the solenoid, the button of this second micro-switch being operable by, a cam 41 secured so as to rotate with the cam shaft 24, the contour of the cam 41 is such that this second micro-switch is closed only when the cam 23 is in a predetermined angular position to permit controlled swinging movement of the lever 16.

*Supporting plate D*

The supporting plate D is secured to a T shoe 43 which is slidably mounted in guideways 43b in the upper portion 43a of the supporting stand of the machine. The T shoe 43 is provided towards it rear end with a downwardly depending rear lug 44 to which one end of a connecting rod 45 is coupled by a shackle pin 46, see Fig. 7. The opposite end of the connection rod is coupled by a pivot pin 47 to the upper end of a swinging lever 48 which is pivotally mounted adjacent its lower end on the cross shaft 17. The swinging lever 48 is pulled in an anticlockwise direction by a tension spring 49 one end of which is connected to the said swinging lever, the opposite end of the spring 49 being anchored to a fixed anchor pin 50 secured to the supporting stand. The swinging lever 48 is turned in a clockwise direction against the pull of the spring 49 by a cam 51 mounted on the cam shaft 24, the peripheral edge of the cam 51 engaging a cam follower 52 carried on the lower end 53 of the swinging lever 48.

During the formation of a layer of rows of the packages A, the supporting plate D is held outwardly in position in the magazine by a catch 54 pivotally mounted on a stub shaft 55 supported in a bracket 56 extending downwardly from the under surface of the upper end of the supporting stand of the machine. The stop is adapted to be moved into a position as shown by the dotted lines, wherein its free end engages with an abutment surface 57 forming part of the lug 44, when in its forward position.

Upon completion of the first layer of rows of packages A on the supporting plate D the said plate is withdrawn by the spring 49 by effecting disengagement of the catch 54 and the abutment surface 57, the layer of packages being deposited on the side of a carton positioned in the magazine.

Withdrawal of the catch 54 is effected by turning the same in a clockwise direction through a crank 58, one end of which is secured to the stub shaft 55 the free end of the crank being connected to one end of a connecting rod 59. The opposite end of the connecting rod is coupled to the free end of one arm 60 of a bell crank lever which is pivotally mounted on a stub shaft 61. The free end of the other arm 62 of the bell crank lever is connected to one end of a tension spring 63 the opposite end of which is anchored to a fixed anchor pin 64. The tension spring 63 operates to pull the bell crank lever in a clockwise direction so that the stop member 54 is urged to the locking position.

Upon completion of a layer of rows of packages A as mentioned above, the bell crank lever is rotated in an anti-clockwise direction whereby the stop member 54 is pulled out of engagement with the abutment surface 57. This movement of the bell crank lever is effected by engagement of a roller 65 with the under edge of the arm 62 of the bell crank lever. The clockwise rotation of the bell crank lever is limited by engagement of one end of a stop screw 66 with a fixed lug (not shown) the stop screw being adjustable to permit adjustment of the angular position of the lever.

The roller 65 is carried by a disc 67 rotatably mounted on the cam shaft 24, the rotational movement of this disc to effect the desired movement of the bell crank lever being controlled by the swinging movements of the swinging arm 16.

For the above purpose a toothed pinion wheel 68 is secured to the disc 67, the teeth of the pinion engaging with the teeth of a gear wheel 69 rotatably mounted on the cross shaft 17. The gear wheel 69 is secured by bolts to a ratchet wheel 70 also rotatably mounted on the cross shaft 17 the teeth of the ratchet wheel being engageable by a pawl 71 pivotally mounted intermediate its length on a pivot pin 72 carried by the swinging lever 16. The pawl 71 is spring loaded by a spring 73 which operates to hold the pawl into engagement with the teeth of the ratchet wheel 70. A holding pawl 70a is provided to lock the ratchet wheel when the pawl 71 is freed from engagement with the teeth of the ratchet wheel.

The arrangement is such that as the swinging arm 16 moves in a clockwise direction the ratchet wheel 70 and gear wheel 69 are rotated, the pinion wheel 68 is also rotated to turn the disc 67 through a predetermined angular movement each time a row of articles is moved into the carton. Repeated operation of the swinging lever 16 will therefore cause sufficient rotational movement of the disc 67 to cause the roller 65 to effect the desired anti-clockwise movement of the bell crank lever 60 to withdraw the stop member 54 to permit withdrawal of the supporting plate D.

Figure 7:
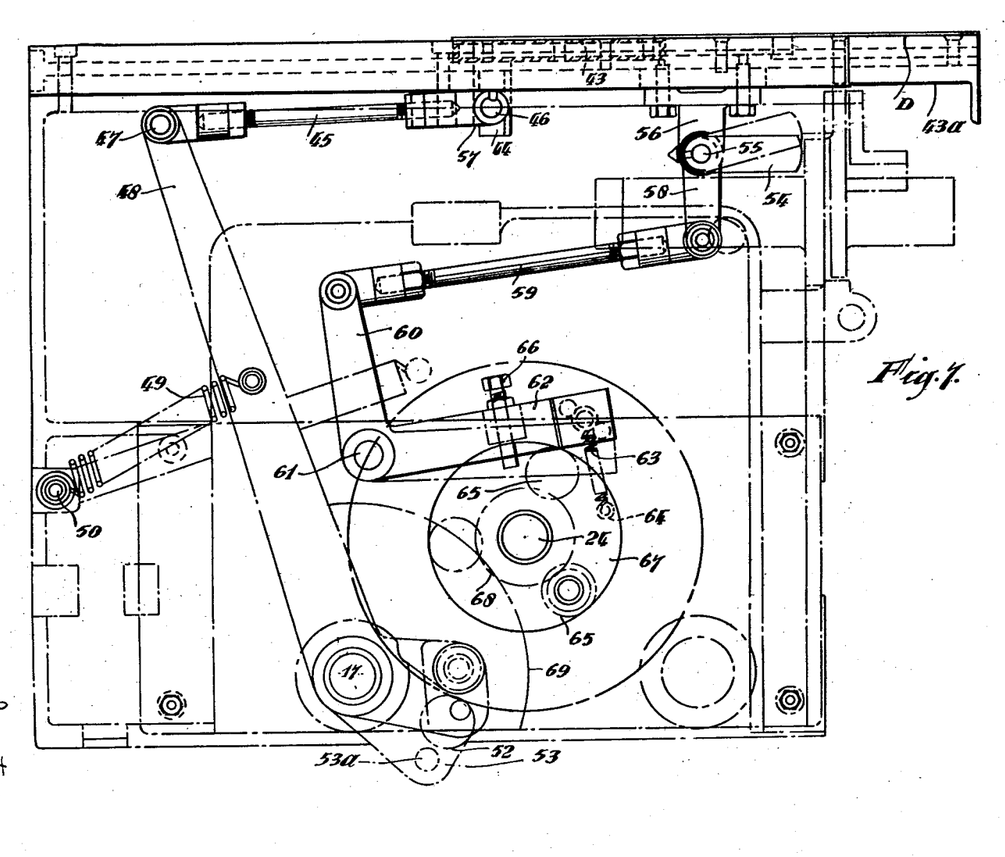
Fig. 7 is a further side view from the left hand side of the machine showing the retractable supporting plate and mechanism for operating the same.

In the construction shown in Fig. 7 of the drawings three rollers 65 are shown equally spaced from one another around the disc 67, this arrangement will permit withdrawal of the supporting plate D after the insertion of four rows of packages A into the carton. It will be appreciated that the number of rollers 65 can be increased or decreased to vary the number of rows of packages to be placed in the carton to complete a layer of packages.

*Magazine and carriage lowering mechanism*

After the withdrawal of the supporting plate D upon completion of a layer and before the same is again moved forwardly of the machine into the supporting position in readiness for the formation of a succeeding layer and its deposit on a previously formed layer it is necessary to lower the carriage C and magazine B a distance equivalent to the height of the packages A.

The magazine B consists of a pair of side plates 74 which are flanged inwardly as shown at 75 at their lower ends. The side plates 74 are spaced apart a distance sufficient to permit a carton to be placed over the same with the open end of the carton facing the pusher platen E. The side plates 74 are secured to the carriage C which is constituted by vertical slides 76 connected together at their lower ends by a plate 77 which is secured to the side frame members by the bolts 78. The slides 76 are provided with bushes, not shown, slidably mounted on vertical posts 79, each of which extends upwardly from the base of the machine, the upper end of each post 79 being located in a housing 80. The housings are supported by the cross beam 5 of the machine framework.

The carriage C is urged to the upper position shown in Fig. 1, by pairs of compression springs 81 and 82 respectively, surrounding the vertical posts 79. The springs 81 are adapted to be compressed between the lower ends of the slides 76 and the upper surface of the base of the machine, the compression springs 82 being positioned so as to be compressible between the upper surface of the supporting stand of the machine and bosses 83 secured to the slides 76 and surrounding the vertical posts 79.

The downward movement of the carriage C and consequently the magazine B is effected by a rack and pinion mechanism the magazine being held in each layer loading position by suitable stop means.

The rack is shown at 84 and is disposed vertically of and secured to the plate 77, the rack teeth being engaged by the teeth of the pinion 85 which is rotatably mounted on a stub shaft 86 carried by a bracket 87 secured to the supporting stand.

Figure 10:
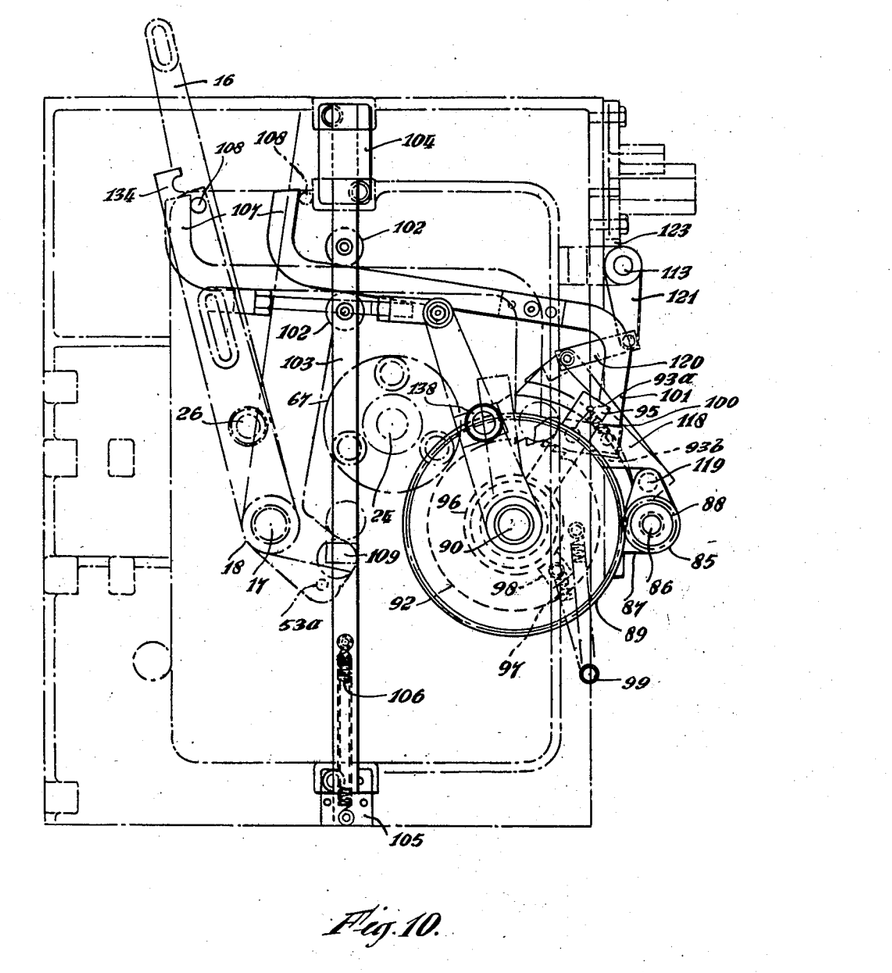
Fig. 10 is a further side view taken from the left hand side of the machine and showing in particular mechanism for lowering the magazine.

Rotation of the pinion 85 is obtained by effecting corresponding rotation of a driving pinion 88 secured to the rack pinion 85 and mounted on the stub shaft 86, see Fig. 10. The teeth of the driving pinion 88 are in engagement with the teeth of a gear wheel 89 which is rotatably mounted on a forward cross shaft 90 extending across the width of the supporting stand. The cross shaft 90 is supported at opposite ends in bearings 91.

The gear wheel 89 is rotated in the appropriate direction to effect lowering of the carriage C through a ratchet wheel and pawl mechanism which is operated each time the supporting plate D is moved to the withdrawn position.

The ratchet wheel is shown at 92 and is mounted on the shaft 90, the ratchet wheel being secured to the gear wheel 89 so that the two will rotate together.

The pawl 93 is pivotally mounted at 93a on a radial arm 95 carried by a boss 96 rotatably mounted on the shaft 90. The radial arm 95 is urged to the position shown in Figure 10 by a tension spring 97 which is anchored by one end to a further radial arm 98 also carried by the boss 96 the opposite end of the spring being secured to a fixed anchorage pin 99 carried by the machine framework. The clockwise rotation of the radial arm 95 is limited by engagement with a fixed stop, not shown.

The rear end of the pawl 93 is provided with a slot extending transversely of its width through which a pivot pin 93b projects, the pivot pin extending outwardly from one end of a cranked lever 101. The outer end of the radial arm 95 and the rear end of the pawl 93 are connected by a tension spring 100 which tends to urge the said pawl into the engaged position with the teeth of the ratchet wheel 92.

The cranked lever 101 extends rearwardly of the machine the lever passing between a pair of rollers 102 carried by a vertical shaft 103. The shaft 103 is slidably mounted adjacent its upper and lower ends in guides 104 and 105 respectively and is urged towards a lower position by a tension spring 106.

The shaft 103 is adapted to be raised to impart through the lower roller 102 a lifting movement to the rear end 107 of the cranked lever 101 to bring this end of the lever into the path of movement of a projection 108 carried by the swinging lever 16 as shown in Fig. 10. Thus as the swinging lever 16 moves in an anti-clockwise direction the cranked lever 101 is drawn in a rearward direction whereby the pawl 93 effects rotation of the ratchet wheel 92 in an anti-clockwise direction (Fig. 10) a corresponding motion imparted to the gear wheel 89 effecting in turn rotation of the rack pinion 85 in a clockwise direction. The carriage C and magazine are therefore moved downwardly an amount controlled by the swinging movement of the swinging lever 16.

The raising movement of the shaft 103 is effected by the engagement of a pin 53a carried by the lower end 53 of the swinging arm 48 with a projection 109 suitably positioned in the length of the shaft 103. The cranked lever 101 is returned to its normal position with its rear end 107 clear of the projection 109 by the tension spring 97 which is free to rotate the boss 96 in a clockwise direction when the swinging lever 16 again commences a clockwise swinging movement, the shaft 103 being again lowered by its spring 106 when the lower end 53 of the swinging arm 48 turns in a direction to move the pin 53a out of engagement with the projection 109.

The carriage C is held in each lowered position by the engagement of one of a plurality of fixed stop members 110 with a movable stop 111, the movable stop member being adapted to be moved out of and into the engaging position as the carriage is lowered.

The stop member 111 is carried by the lower end of an arm 112 which is pivotally mounted by its upper end on a pivot pin 113 supported in the machine framework at the front thereof. The pivot pin has secured thereto an arm 114 which is spring loaded by a tension spring 115. Each stop member 110 is secured to the slides 76 of the carriage C so as to move therewith. Each stop member 110 is provided with a sloping face 116 and as the carriage is lowered the movable stop 111 is engaged by the sloping face 116 whereby the arm 112 is displaced angularly against the action of the spring 115. Continued downward movement of the carriage C brings the ledge 117 of the stop member 110 beneath the movable stop 111 so that the arm 112 is free to be pulled by the spring 115 to the normal position so that the carriage is then held in the lowered position by the engagement between the ledge 117 and the movable stop 111.

The downward movement of the carriage C is continued to bring the ledge 117 a short distance below the movable stop 111 the carriage being then permitted to rise again under the action of the springs 81 to bring the stop members into engagement with one another as a result of lost motion accumulated in the mechanism.

The stop members 110 are preferably and as shown mounted so that the spacing of the same is adjustable whereby the step by step downward movement of the carriage C can be adjusted to suit packages of different height.

When the carton is filled and the carriage is in its fully lowered position the carton is in registration with an ejector plate which is operable to push the carton and contents from the magazine, the carton being, for example, discharged onto a conveyor to transfer the same to a sealing station or other position.

*Ejector plate mechanism*

The ejector plate is shown at 124 and is disposed vertically at the front end of the machine. The discharge plate is secured to a framework 125 which is carried by a pair of spaced guide bars 126 slidably mounted in guides 127 carried by the framework of the machine. The framework is spring loaded by a pair of springs 128 the springs operating to maintain the discharge plate 124 in a retracted position.

Figures 8, 9:
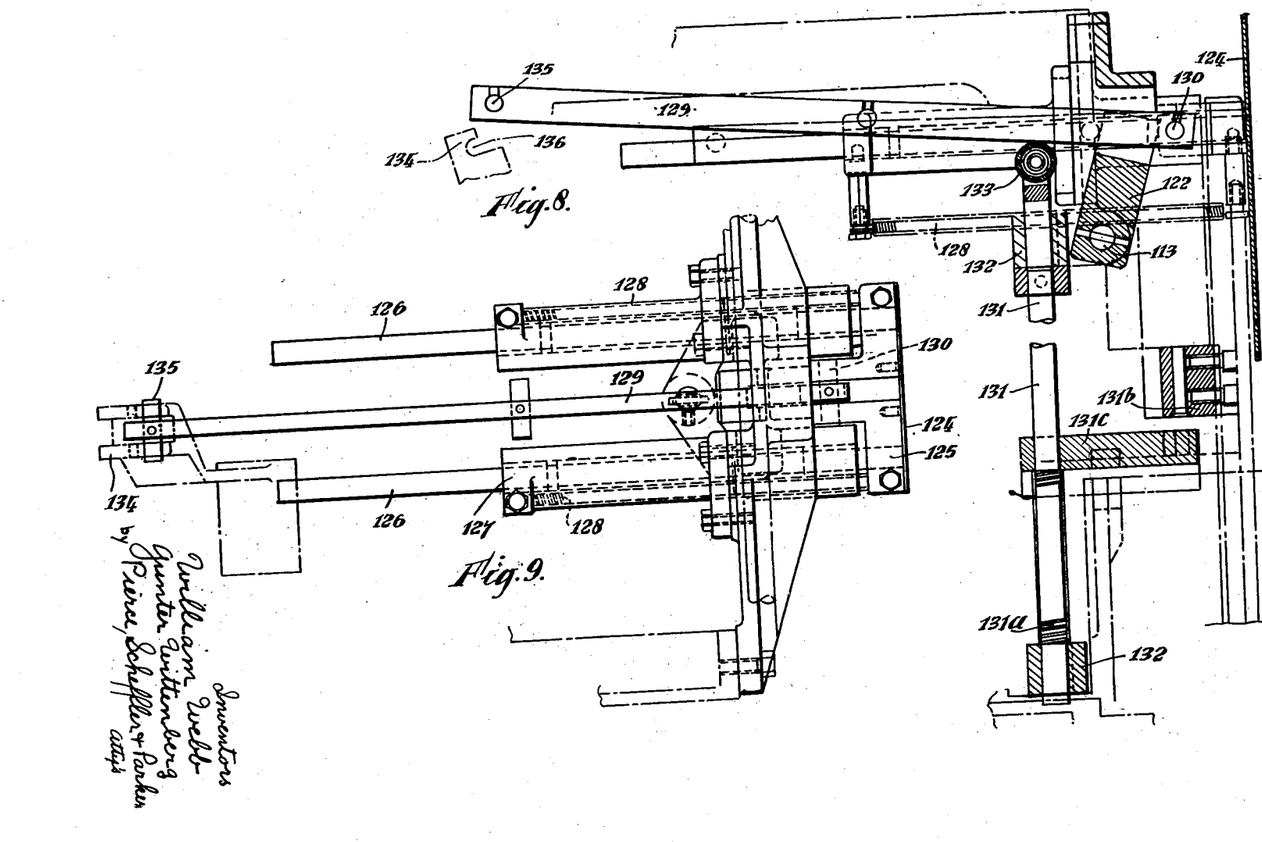
Fig. 8 is a view from the left hand side of the machine showing discharge means for ejecting a filled carton from the magazine and the operating mechanism associated with the same.
Fig. 9 is a plan view of the mechanism shown in Fig. 8.

The ejector plate is moved in a forward direction to effect discharge of a carton through the medium of a push rod 129 which is pivotally mounted about its forward end on a pivot pin 130 carried by the framework 125. The push rod 129 is normally held in the raised position shown in Fig. 8 by a vertical shaft 131 which is slidably mounted in upper and lower bushes 132 carried by the machine framework, the upper end of this shaft being provided with a bearing 133 the periphery of which engages the under surface of the push rod 129, the vertical shaft 131 being maintained in the upper position by a compression spring 131a which surrounds the lower end.

To obtain the outward movement of the discharge plate 124 the vertical shaft 131 is pulled downwardly as a result of the engagement of a foot 131*b* mounted on the carriage with a radius rod 131*c* which extends outwardly from the vertical shaft 131, such engagement causing the said vertical shaft to move downwardly an amount sufficient to permit the rear end of the push rod to come into registration with the upper end of a swinging arm 134 which is pivotally mounted by its lower end on the cross shaft 17. The rear end of the push rod 129 is provided with a transverse pin 135 which when the push rod is in the lower position is adapted to engage in the transverse slots 136 formed in the forked upper end of the swinging arm 134 such engagement preventing the push rod 129 from turning about its pivoted end during outward movement of the discharge plate.

The swinging arm 134 is moved backwards and forwards about the shaft 17 by a cam 137 mounted on so as to be rotatable with the cam shaft 24 the peripheral edge of the cam being in contact with a cam follower 138 carried by a lever 139. The lever 139 is pivotally mounted by its lower end on the forward shaft 90 and is connected at its upper end by a connecting rod 140 to the swinging arm 134.

After the ejection or discharge of a filled carton from the magazine B the magazine and carriage C are returned automatically to the upper position by the compression springs 82, spring loaded buffers (not shown) being provided in the housings 80 to limit the said upward movement and eliminate shocks to the carriage and framework of the machine as the carriage reaches the upper position.

To enable the carriage to move upwardly it is necessary to disengage the pawl 93 from the teeth of the ratchet wheel 92, so that the ratchet wheel and rack pinion 85 can rotate freely as the carriage rises.

For this purpose the pawl 93 is turned about the pivot in a direction to withdraw the same from engagement with the teeth of the ratchet wheel 92, the pawl being so held as the same is returned to its normal position by movement of the cranked lever 101 from a rearward position to the forward position upon the completion of the cycle of operations.

The turning movement of the pawl is obtained by depressing the rear end of the same by a lever 118 which is pivotally mounted by one end on a pivot pin 119 carried by the bracket 87. This lever is turned in an anticlockwise direction to release the pawl 93 upon movement of a link 120 which is secured by one end to the free end of the lever 118, the other end of the link 120 being connected to a radius arm 121 pinned to the shaft 113.

The shaft 113 is turned in a clockwise direction (Fig. 8) to release the pawl when the carton ejector push rod 129 reaches the outer limit of its travel through a crank 122 secured by one end to the shaft 113, the crank being turned in the appropriate direction by the engagement at its free end of a stud 122*a* carried by the push rod 129.

The pawl engaging edge of the lever 118 is curved as shown in Fig. 10 to conform to the arc of travel of the pawl so that the same is maintained out of the ratchet wheel engaging position during its return movement.

The engagement of the transverse pin 135 on the push rod 129 in the transverse slots 136 at the upper end of swinging arm 134 ensures that the push rod 129 is held down to maintain the carton ejector plate in the forward position whilst the magazine and carriage move upwardly. If the push rod were not held down during this movement, as soon as the carriage commenced to move upwards the resulting disengagement between the foot 131*b* and radius rod 131*c* would permit vertical shaft 131 to rise with the result that the push rod 129 would lift and the extractor plate be withdrawn. Thus the crank 122 would be rotated in an anti-clockwise direction the resulting movement of the shaft 113 effecting disengagement between the lever 118 and the pawl 93. The pawl would then reengage the teeth of the ratchet wheel whereby the same would be locked against further free rotation to prevent the carriage C from rising.

In the apparatus described above the rectractable supporting plate D may consist simply of a flat plate of thin gauge material. However to accommodate any irregularities in the packages which may result in the leading edge of the retractable supporting plate fouling the packages of a layer as the said plate moves forwardly over the layer, the said leading edge may be provided with means to guide the same over the packages or the plate itself may be shaped for this purpose.

For example the leading edge can be provided with a tip consisting of a thin upwardly curved flexible strip or with a plurality of spring fingers. The resilience of such strip or fingers must be sufficient to permit the same to bend as the supporting plate is retracted from beneath a formed layer so that the packages in the layer are not disturbed. Alternatively the retractable supporting plate may be curved across its width, the trailing and leading edges projecting upwardly, the flexibility of the plate permitting deformation of the same under the weight of a layer of packages so that the plate can be withdrawn without displacing the packages in an assembled layer.

For the stacking of certain articles such as solid articles which are substantially non-deformable, or for packing such articles into cartons or containers, the supporting plate may be dispensed with, the operating mechanism therefore being utilised to insert a spacer of cardboard, wood or other material, between the layers.

The spacers can, for example, be fed either automatically or by hand from a stack to spacer holding means carried by the T shoe 43, movement of the T shoe in one direction serving to position a spacer over an assembled layer of articles, the spacer holding means being operable to release the spacer as the T shoe is withdrawn in readiness for positioning a further spacer.

The method and apparatus of the present invention are particularly suitable for the packing of articles into containers for transport thus avoiding the use of operators normally employed for this purpose whereby a considerable saving of manpower is possible.

What we claim is:

1. Apparatus for stacking articles, said apparatus comprising a plate for supporting a positioned row of articles to be stacked, platform means for supporting a carton to receive the stacked articles, said supporting plate extending over said platform means to enter a carton supported thereon, pusher means having a platen extending along a length of the assembled row, cam-operated lever means operable to effect movement of the platen in one direction and simultaneously to withdraw said supporting plate from its position over said platform means after a predetermined number of rows have been assembled on said supporting plate by said platen thereby to discharge assembled rows of articles from the supporting plate as a layer in the carton supported by the platform means, and to return the platen in the opposite direction in readiness for the discharge of a further row of articles, means for effecting vertical movement of said platform means including a rack on said platform means, a gear meshing with said rack, pawl and ratchet mechanism for driving said gear and means controlled by the lever means which effects movement of said supporting plate for operating said pawl and ratchet mechanism, and means returning said supporting plate into position over said platform means at the completion of each vertical movement thereof.

2. Apparatus as recited in claim 1, wherein said vertical movements of said platform means are in a downward direction after the deposit of each layer of articles in the carton supported by said platform means, in combination with means latching said platform means against upward movement after each downward movement thereof.

3. Apparatus as recited in claim 2, in combination with means for discharging a carton from said platform means upon completion of the filling thereof.

4. Apparatus as recited in claim 2, in combination with means for discharging a carton from said platform means upon completion of the filling thereof, and means actuated by said carton-discharging means for releasing said latching means.

References Cited in the file of this patent

UNITED STATES PATENTS

| | | |
|---|---|---|
| 768,104 | Weida | Aug. 23, 1904 |
| 814,454 | Keyes | Mar. 6, 1906 |
| 1,798,608 | Kasser | Mar. 31, 1931 |
| 1,874,669 | Wagner | Aug. 30, 1932 |
| 1,942,555 | Kimball et al. | Jan. 9, 1934 |
| 2,045,292 | Carey | June 23, 1936 |
| 2,358,447 | Creamer | Sept. 19, 1944 |
| 2,536,672 | Tyrrell | Jan. 2, 1951 |
| 2,650,746 | Rideout et al. | Sept. 1, 1953 |
| 2,675,152 | Perry | Apr. 13, 1954 |